US012659014B2

(12) United States Patent
Ma et al.

(10) Patent No.: US 12,659,014 B2
(45) Date of Patent: Jun. 16, 2026

(54) FULL-DUPLEX ANTENNA AND COMMUNICATION NODE

(71) Applicant: ZTE Corporation, Shenzhen (CN)

(72) Inventors: Yihua Ma, Shenzhen (CN); Zhifeng Yuan, Shenzhen (CN); Yuzhou Hu, Shenzhen (CN); Weimin Li, Shenzhen (CN); Zhigang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 279 days.

(21) Appl. No.: 18/288,035

(22) PCT Filed: Apr. 21, 2022

(86) PCT No.: PCT/CN2022/088305
§ 371 (c)(1),
(2) Date: Oct. 23, 2023

(87) PCT Pub. No.: WO2022/228282
PCT Pub. Date: Nov. 3, 2022

(65) Prior Publication Data
US 2024/0204856 A1     Jun. 20, 2024

(30) Foreign Application Priority Data
Apr. 29, 2021    (CN) .......................... 202110475027.6

(51) Int. Cl.
*H04B 7/08*        (2006.01)
*H04L 5/14*        (2006.01)

(52) U.S. Cl.
CPC ............. *H04B 7/0874* (2013.01); *H04L 5/14* (2013.01)

(58) Field of Classification Search
CPC ........ H04B 7/0874; H04B 1/12; H04B 1/525; H04B 1/54; H04B 7/0837; H04B 7/0802; H04L 5/14; H04L 5/1461
See application file for complete search history.

(56) References Cited

U.S. PATENT DOCUMENTS

2014/0233436 A1*  8/2014  Long .......................... H04L 5/14
                                                        370/278
2018/0115370 A1*  4/2018  Kim ........................ H04B 15/00
                  (Continued)

FOREIGN PATENT DOCUMENTS

CN        103190084 A      7/2013
CN        103190084 B      4/2016
                  (Continued)

OTHER PUBLICATIONS

International Search Report and Written Opinion for International Application No. PCT/CN2022/088305, mailed Jul. 1, 2022.
                  (Continued)

*Primary Examiner* — Hashim S Bhatti
(74) *Attorney, Agent, or Firm* — Wolf, Greenfield & Sacks, P.C.

(57)                ABSTRACT

Disclosed are a full-duplex antenna and a communication node, where the full-duplex antenna may include a transmit antenna, N receive antenna groups and N radio frequency links. Each of the radio frequency links is configured to acquire first signals received by all receive antennas in one of the receive antenna groups connected to the radio frequency link, and synthesize a second signal according to the first signals. A power of a self-interference signal related to the transmit antenna in each of the first signals in a full-duplex transmission mode is defined as a first power, a power of a self-interference signal related to the transmit antenna in the second signal in the full-duplex transmission mode is defined as a second power, and the second power is less than the first power.

18 Claims, 10 Drawing Sheets

(56) References Cited

U.S. PATENT DOCUMENTS

2020/0107249 A1    4/2020   Stauffer et al.
2024/0080776 A1*   3/2024   Khosravirad ...... H04B 7/15578

FOREIGN PATENT DOCUMENTS

WO      WO 2020/034607  A1    2/2020
WO      WO 2020/201901  A1    10/2020

OTHER PUBLICATIONS

Extended European Search Report dated Mar. 3, 2025 connection with European Application No. 22794753.8.

* cited by examiner

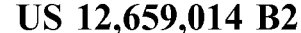

Modulation

Reference signal or data signal and reference signal

Data symbol

Radio frequency link

Calculation of residual self-interference $$y = v_1 y_1 + v_2 y_2$$

FIG. 11

Radio frequency link        Radio frequency link        . . .        Radio frequency link $$y_1 = v_{1,1} y_{1,1} + v_{1,2} y_{1,2} \qquad y_2 = v_{2,1} y_{2,1} + v_{2,2} y_{2,2} \qquad y_N = v_{N,1} y_{N,1} + v_{N,2} y_{N,2}$$

$$Y = [y_1, y_2, \ldots, y_N]^T \in C^{N \times L} \qquad \text{N second signals}$$

$$X = WY, \quad W \in C^{K \times L} \qquad \text{K data estimation signals}$$

Demodulation, decoding, and CRC check

Checked data signal

FIG. 12

FULL-DUPLEX ANTENNA AND COMMUNICATION NODE

CROSS-REFERENCE TO RELATED APPLICATION

This application is a national stage filing under 35 U.S.C. § 371 of International Patent Application Serial No. PCT/CN2022/088305, filed Apr. 21, 2022, which claims priority to Chinese patent application No. 202110475027.6, filed Apr. 29, 2021. The contents of these applications are incorporated herein by reference in their entirety.

TECHNICAL FIELD

The present disclosure relates to the field of communication, for example, to a full-duplex antenna and a communication node.

BACKGROUND

With the continuous development of Internet of Vehicles (IoV) technologies, the building of collaboration capabilities in the IoV field has become an important issue to ensure and promote the development of the IoV industry. To effectively support various applications including autonomous driving, the IoV technology needs to support Ultra Reliable Low Latency Communication (URLLC). However, existing Vehicle to Vehicle (V2V) communication uses very few antennas (for example, one or two antennas) and adopts a half-duplex design, which is not conducive to the realization of URLLC.

SUMMARY

The present disclosure provides a full-duplex antenna and a communication node, which adopt a multi-receive antenna technology to increase the number of users supported and effectively suppress self-interference of antennas, and adopts a full-duplex technology to realize simultaneous transmitting and receiving of data, thereby greatly improving the spectral efficiency and reducing the transmission latency.

According to an embodiment of the present disclosure, a full-duplex antenna is provided. The full-duplex antenna may include a transmit antenna, N receive antenna groups, and N radio frequency links, where N is an integer greater than or equal to 2. The receive antenna groups are connected to the radio frequency links on a one-to-one basis. Each of the receive antenna groups includes at least two receive antennas.

Each of the frequency links is configured to acquire first signals received by all receive antennas in one of the receive antenna groups connected to the radio frequency link, and synthesize a second signal according to the first signals. A power of a self-interference signal related to the transmit antenna in each of the first signals in a full-duplex transmission mode is defined as a first power. A power of a self-interference signal related to the transmit antenna in the second signal in the full-duplex transmission mode is defined as a second power. The second power is less than the first power.

According to an embodiment of the present disclosure, a communication node is provided. The communication node may include a full-duplex antenna having the features of any one of the above embodiments.

The above embodiments and other aspects and implementations of the present disclosure will be further described in the brief description of drawings, detailed description, and claims.

BRIEF DESCRIPTION OF DRAWINGS

FIG. 11 is a schematic diagram of adjusting, by a full-duplex antenna, a combining coefficient by calculating a residual self-interference signal strength according to an embodiment;

FIG. 12 is a schematic diagram of combining N second signals to obtain K data estimation signals by a full-duplex antenna according to an embodiment;

DETAILED DESCRIPTION

Figure 1:
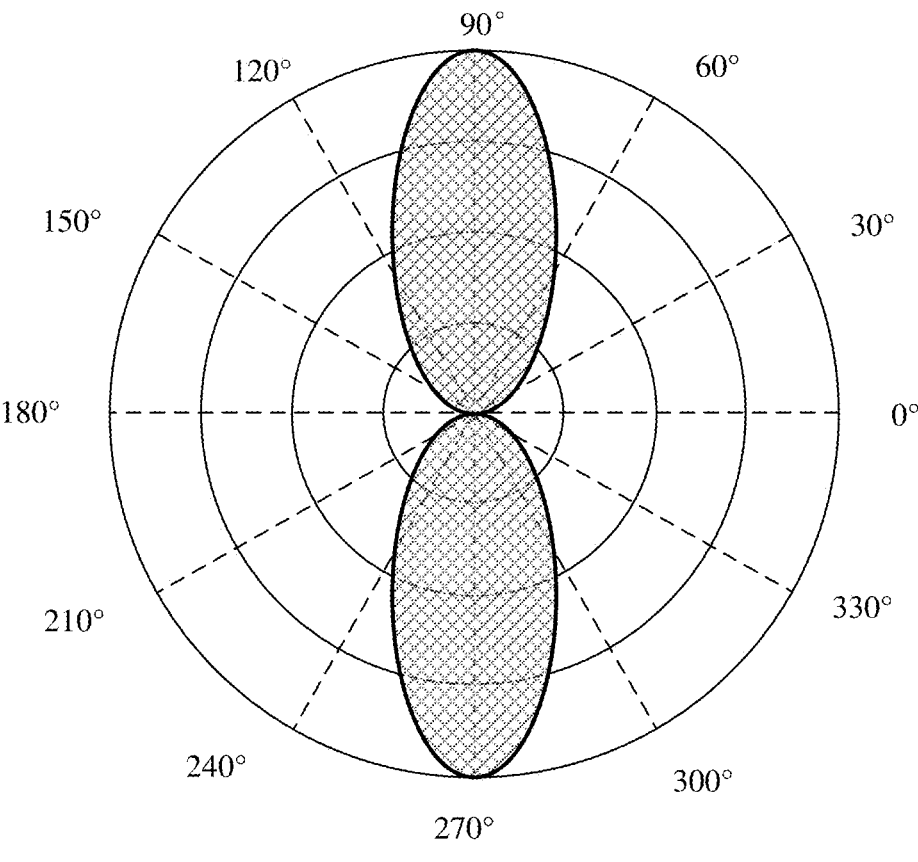
FIG. 1 is a schematic diagram of a receive beam formed by a receive antenna group according to an embodiment.

The embodiments of the present disclosure will be described in detail with reference to the accompanying drawings.

The IoV technology is a key technology that relies on advanced communication technologies, sensing technologies, computing technologies, and control technologies to fully sense and intelligently manage vehicles and traffic, and is currently in a critical stage of accelerated development. With the continuous maturity of the IoV technology and the continuous enrichment of service capabilities, the potential market and profit space of the IoV technology are huge. In addition, because this field has the characteristics involving automobile, electronics, communication, Internet and other industries, the building of collaboration capabilities in the IoV field has become an important issue to ensure and promote the development of the IoV industry.

To effectively support various applications including autonomous driving, the IoV technology needs to support URLLC. However, existing V2V communication uses very few antennas (for example, one or two antennas) and adopts a half-duplex design. As a result, data of only one user can be transmitted on one resource, and sensing-based semi-persistent scheduling (sensing-based SPS) is additionally required to ensure that data of each user is transmitted on a different time-frequency resource, which is not conducive to the realization of URLLC. Especially in high-density scenarios, sensing-based SPS cannot ensure transmission performance.

Embodiments of the present disclosure provide a mobile communication network (including but not limited to the 5th Generation (5G)) applicable to an IoV scenario. A network architecture of the network may include a terminal device and an access network device. The terminal device is wirelessly connected to the access network device. The terminal device may be fixed or mobile. In an embodiment of the present disclosure, a full-duplex antenna applicable to the above network architecture is provided. With the use of a multi-receive antenna technology, the number of users supported is increased, and self-interference of antennas is effectively suppressed. Meanwhile, the use of a full-duplex technology realizes simultaneous transmitting and receiving of data, which greatly improves the spectral efficiency and reduces the transmission latency.

The access network device is an access device that the terminal device wirelessly accesses to in the mobile communication system, and may be a base station, an evolved NodeB (cNodeB), a Transmission/Reception Point (TRP), a next generation NodeB (gNB) in a 5G mobile communication system, a base station in a future mobile communication system, or an access node in a WiFi system, etc., or may be a module or unit that implements some functions of the base station, for example, may be a Central Unit (CU) or a Distributed Unit (DU). The specific technology and the specific equipment form used by the access network device are not limited in the embodiments of the present disclosure. In the present disclosure, the access network device may be briefly referred to as a network device. Unless otherwise specified, the term "network device" refers to an access network device.

The terminal device may also be referred to as a terminal, a user equipment (UE), a mobile station, a mobile terminal, etc. The terminal device may be a mobile phone, a tablet computer, a computer with a wireless transceiver function, a Virtual Reality (VR) terminal device, an Augmented Reality (AR) terminal device, a wireless terminal in industrial control, a wireless terminal in unmanned driving, a wireless terminal in an on-line surgical operation, a wireless terminal in a smart grid, a wireless terminal in transportation safety, a wireless terminal in a smart city, a wireless terminal in a smart home, etc. The specific technology and the specific equipment form used by the terminal device are not limited in the embodiments of the present disclosure.

A full-duplex antenna, a communication node, and technical effects thereof will be described below.

An embodiment of the present disclosure provides a full-duplex antenna, including: a transmit antenna, N receive antenna groups, and N radio frequency links, where N is an integer greater than or equal to 2. The receive antenna groups are connected to the radio frequency links on a one-to-one basis. Each of the receive antenna groups includes at least two receive antennas. Each of the radio frequency links are configured to acquire first signals received by all receive antennas in one of the receive antenna groups connected to the radio frequency link, and synthesize a second signal according to the first signals. A power of a self-interference signal related to the transmit antenna in each of the first signals in a full-duplex transmission mode is defined as a first power. A power of a self-interference signal related to the transmit antenna in the second signal in the full-duplex transmission mode is defined as a second power. The second power is less than the first powers.

The full-duplex antenna provided in the embodiment of the present disclosure adopts a multi-antenna technology at a receiving end, where receive antennas are divided into N receive antenna groups, and any of the receive antenna groups forms a fixed receive beam. FIG. 1 is a schematic diagram of a receive beam formed by a receive antenna group according to an embodiment. It is assumed that the receive antenna group includes two receive antennas, and the receive beam of the receive antenna group is shown in shaded portions in FIG. 1. It can be seen that when the transmit antenna is in a minimum energy region (e.g., 0° and 180° in FIG. 1) of the receive beam of the receive antenna group, self-interference caused by the transmit antenna to the receive antenna group can cancel each other, thereby achieving an effect of suppressing self-interference. In addition, for a range from 45° to 135° and from 215° to 305° in the far field, the receiving effect of the receive antenna group is greater than or equal to the receiving effect of one antenna. Therefore, self-interference can be canceled within the receive antenna group without affecting the receiving coverage effect at other positions.

Figure 2A:
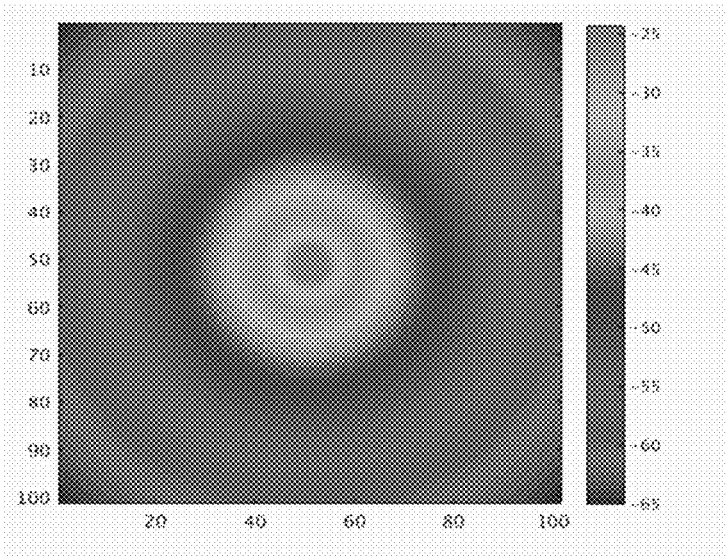
FIG. 2a is a schematic diagram of a simulation result of energy coverage of a conventional antenna.
Figure 2B:
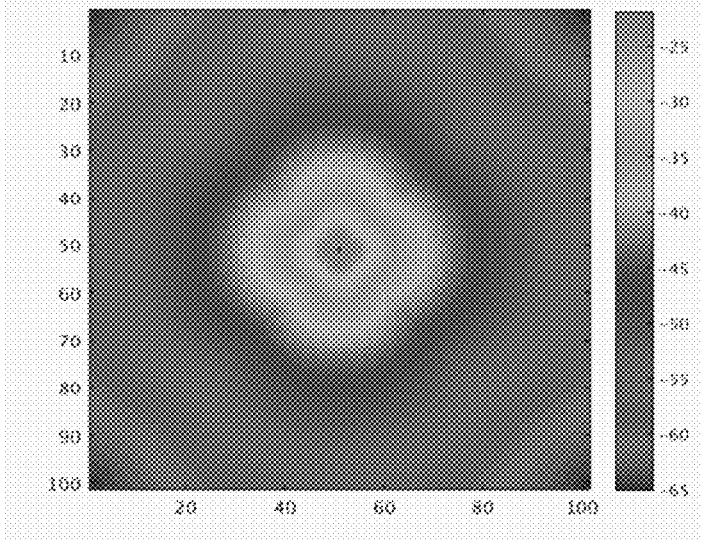
FIG. 2b is a schematic diagram of a simulation result of energy coverage of a full-duplex antenna according to an embodiment of the present disclosure.
Figure 2C:
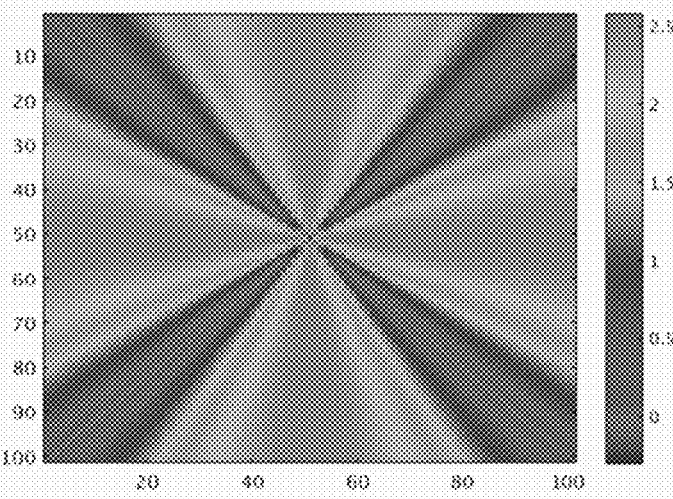
FIG. 2c is a diagram showing comparison of self-interference suppression of a conventional antenna and a full-duplex antenna according to an embodiment of the present disclosure.

FIG. 2a shows a schematic diagram of a simulation result of energy coverage of a conventional antenna. FIG. 2b shows a schematic diagram of a simulation result of energy coverage of a full-duplex antenna according to an embodiment of the present disclosure. FIG. 2c is a diagram showing comparison of self-interference suppression of a conventional antenna and a full-duplex antenna according to an embodiment of the present disclosure. Assuming that a simulated coverage is a square of 100 m×100 m, in a conventional antenna structure, four receive antennas are deployed at four corners of a square of 1 m×1 m in the center of the simulated coverage, and a transmit antenna is located in the center of the square of 1 m×1 m. In the structure of the full-duplex antenna of the present disclosure, four receive antenna groups are deployed at four corners of a square of 1 m×1 m in the center of the simulated coverage, each receive antenna group includes two receive antennas, and a transmit antenna is located in the center of the square of 1 m×1 m. FIG. 2c shows a result of subtracting the simulation result of FIG. 2a from the simulation result of FIG. 2b. It can be seen that there is gain in most areas, and there is an attenuation of less than 0.5 dB on the diagonal. It can be seen from a comparison of FIG. 2a to FIG. 2c that when the transmit antenna is in a minimum energy region of the receive beam of the receive antenna group, self-interference caused by the receive antenna group to the transmit antenna can cancel each other, thereby achieving an effect of suppressing self-interference.

Figure 3:
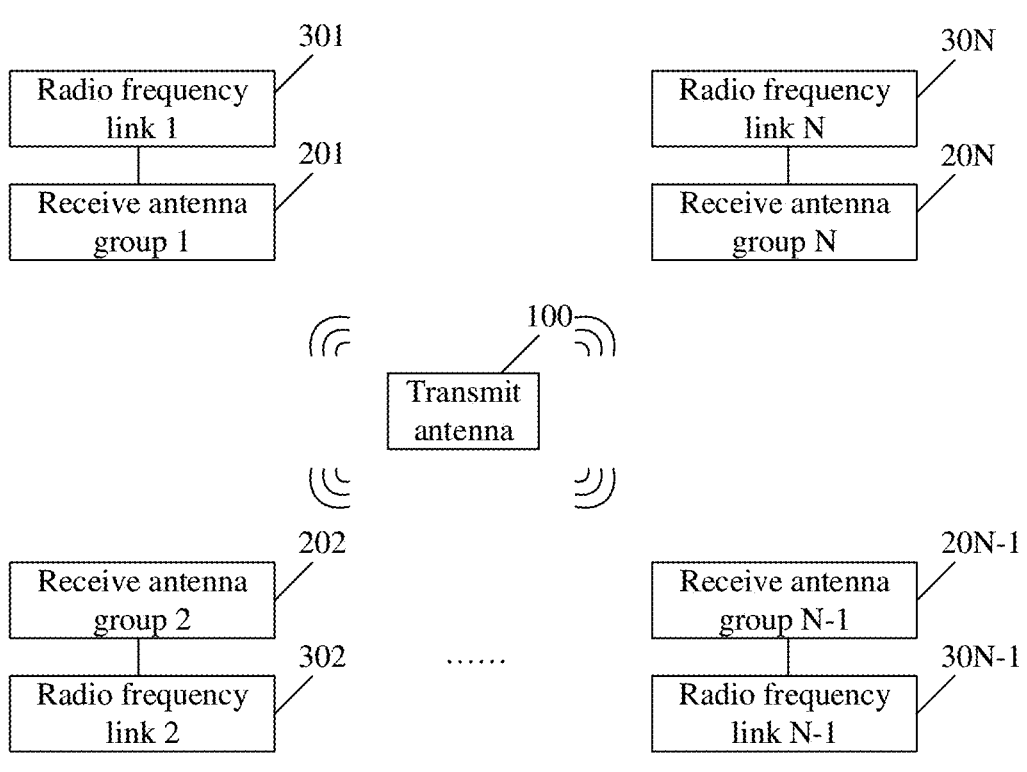
FIG. 3 is a schematic structural diagram of a full-duplex antenna according to an embodiment.

FIG. 3 is a schematic structural diagram of a full-duplex antenna according to an embodiment. Referring to FIG. 3, the full-duplex antennas includes: a transmit antenna 100, N receive antenna groups (designated in FIG. 3 as a receive antenna group 1 201, a receive antenna group 2 202, . . . , a receive antenna group N-1 20N-1, and a receive antenna group N 20N, respectively), and N radio frequency links (designated in FIG. 3 as a radio frequency link 1 301, a radio frequency link 2 302, . . . , a radio frequency link N-1 30N-1, and a radio frequency link N 30N, respectively). In a full-duplex transmission mode, the transmit antenna 100 causes self-interference to the N receive antenna groups.

In an embodiment, N is an even number greater than or equal to 2. When N is an even number greater than or equal to 2, the design of the full-duplex antenna can meet a requirement on symmetry, and achieve a better effect of antenna self-interference suppression.

Each of the receive antenna groups includes at least two receive antennas, and N is an integer greater than or equal to 2. Taking the full-duplex antenna shown in FIG. 3 as an example, each of the receive antenna groups includes at least two receive antennas, which may include either of the following two cases: (1) each of the N receive antenna groups includes a same number of receive antennas, e.g., M receive antennas, where M is an integer greater than or equal to 2; (2) the number of receive antennas included in each of the N receive antenna groups is greater than or equal to 2, but different receive antenna groups may include different numbers of receive antennas. For example, the receive antenna groups 1 201 and 2 202 shown in FIG. 3 each include two receive antennas, and the receive antenna groups N-1 20N-1 and N 20N each include three receive antennas.

In an embodiment, in the above case (1), M may be an even number greater than or equal to 2, such that the design of the full-duplex antenna can more easily meet the requirement on symmetry.

The receive antenna groups are connected to the radio frequency links on a one-to-one basis (as shown in FIG. 3, the receive antenna group 1 201 is connected to the radio frequency link 1 301, the receive antenna group 2 202 is connected to the radio frequency link 2 302, . . . , the receive antenna group N-1 20N-1 is connected to the radio frequency link N-1 30N-1, and the receive antenna group N 20N is connected to the radio frequency link N 30N). The radio frequency link is configured for acquiring first signals received by all receive antennas in the receive antenna group connected to the radio frequency link, and synthesizing a second signal according to the first signals. A power of a self-interference signal related to the transmit antenna in each of the first signals in a full-duplex transmission mode is defined as a first power. A power of a self-interference signal related to the transmit antenna in the second signal in the full-duplex transmission mode is defined as a second power. The second power is less than any of the first powers. Ideally, the second power is zero. Assuming that the receive antenna group 1 201 shown in FIG. 3 includes two receive antennas, the radio frequency link 1 301 connected to the receive antenna group 1 201 can acquire two first signals received by the two receive antennas and synthesize a second signal according to the two first signals.

In an embodiment, the transmit antenna 100 is located in an intersection region of minimum energy regions of the receive beams of the N receive antenna groups. In this way, self-interference signals related to the transmit antenna 100 can cancel each other, thereby achieving an effect of self-interference suppression.

In an embodiment, the transmit antenna 100 may be located at, for example, but not limited to, any of the following positions:

the transmit antenna 100 is located at an intersection point of perpendicular bisectors of the N receive antenna groups; or the transmit antenna 100 is located at a midpoint of the N receive antenna groups; or the transmit antenna 100 is located at an intersection point of extension lines of lines connecting the antennas in the N receive antenna groups.

In an embodiment, for a $j^{th}$ receive antenna group among the N receive antenna groups and a radio frequency link connected to the $j^{th}$ receive antenna group, the $j^{th}$ receive antenna group includes M receive antennas, where $1 \leq j \leq N$, and $M \geq 2$.

A second signal synthesized from the $j^{th}$ receive antenna group is $y_j = v_{j,1} y_{j,1} + v_{j,2} y_{j,2} + \ldots + v_{j,M} y_{j,M}, y_j \varepsilon C^{L \times 1}$.

Where, $y_{j,1}$ represents a first signal received by a first receive antenna in the $j^{th}$ receive antenna group, $y_{j,2}$ represents a first signal received by a second receive antenna in the $j^{th}$ receive antenna group, . . . , and $y_{j,M}$ represents a first signal received by an $M^{th}$ receive antenna in the $j^{th}$ receive antenna group; $v_{j,1}$ represents a combining coefficient corresponding to the first receive antenna in the $j^{th}$ receive antenna group, $v_{j,2}$ represents a combining coefficient corresponding to the second receive antenna in the $j^{th}$ receive antenna group, . . . , and $v_{j,M}$ represents a combining coefficient corresponding to the $M^{th}$ receive antenna in the $j^{th}$ receive antenna group.

Where, C represents a complex number, L represents a length of the second signal, and $C^{L \times 1}$ represents a complex vector set with a length of L.

In an embodiment, the combining coefficient is a complex number, including an amplitude and a phase; the amplitude of the combining coefficient is fixed or adjustable; and the phase of the combining coefficient is fixed or adjustable.

In an embodiment, if at least one selected from a group consisting of the amplitude of the combining coefficient and the phase of the combining coefficient is adjustable:

the radio frequency link is configured to adjust at least one selected from a group consisting of the amplitude of the combining coefficient and the phase of the combining coefficient by minimizing a self-interference signal strength using a reference signal sent by the transmit antenna 100; or the radio frequency link is configured to adjust at least one selected from a group consisting of the amplitude of the combining coefficient and the phase of the combining coefficient, by calculating a residual self-interference signal strength using a data signal or a data signal and a reference signal sent by the transmit antenna 100; or the radio frequency link is configured to adjust at least one selected from a group consisting of the amplitude of the combining coefficient and the phase of the combining coefficient through antenna-by-antenna channel estimation using a reference signal sent by the transmit antenna 100.

In an embodiment, if the amplitude of the combining coefficient and the phase of the combining coefficient are fixed:

when the transmit antenna 100 is located at an intersection point of perpendicular bisectors of the N receive antenna groups, where N is an even number, and each of the receive antenna groups includes 2 receive antennas, $v_{j,1} = -v_{j,2}$; or when the transmit antenna 100 is located at a midpoint of the N receive antenna groups, where N is an even number, and each of the receive antenna groups includes 2 receive antennas, $v_{j,1} = -v_{j,2}$; or when the transmit antenna 100 is located at a midpoint of the N receive antenna groups, where N is an even number, and each of the receive antenna groups includes 4 receive antennas, $v_{j,1}=-v_{j,4}$, and $v_{j,2}=-v_{j,3}$; or when the transmit antenna 100 is located at an intersection point of extension lines of lines connecting the antennas in the N receive antenna groups, where N is an even number, each of the receive antenna groups includes 2 receive antennas, and a pitch between the 2 receive antennas is equal to (P+0.5) times a wavelength of the full-duplex antenna, $v_{j,1}=v_{j,2}$, wherein P is a non-negative integer.

In an embodiment, the N second signals synthesized from the N receive antenna groups are subjected to inter-group combining to obtain K data estimation signals, and the K data estimation signals are used for demodulation and decoding.

In an embodiment, the N second signals $Y=[y_1, y_2, \ldots, y_N]^T \in C^{N \times L}$ are subjected to inter-group combining to obtain the K data estimation signals $X=WY$, $W \in C^{K \times L}$; or the N second signals $Y=[y_1, y_2, \ldots, y_N]^T \in C^{N \times L}$ are subjected to self-interference cancellation using a transmit signal $X_{st}$ on the transmit antenna 100 to obtain Y, and Y are subjected to inter-group combining to obtain the K data estimation signals X=WY', We $C^{K \times L}$; or the N second signals $Y=[y_1, y_2, \ldots, y_N]^T \in C^{N \times L}$ are subjected to self-interference cancellation and continuous interference cancellation in sequence to obtain Y", and Y" are subjected to inter-group combining to obtain the K data estimation signals X=WY", $W \in C^{K \times L}$, where the transmit signal is a data signal or a reference signal, C represents a complex number, L represents a length of the second signal, and $C^{K \times L}$ represents a K×L complex number matrix set.

In an embodiment, the continuous interference cancellation is symbol-level, or the continuous interference cancellation is codeword-level.

Some implementations are listed below for illustrating the full-duplex antenna provided in the embodiments of the present disclosure.

Figure 4:
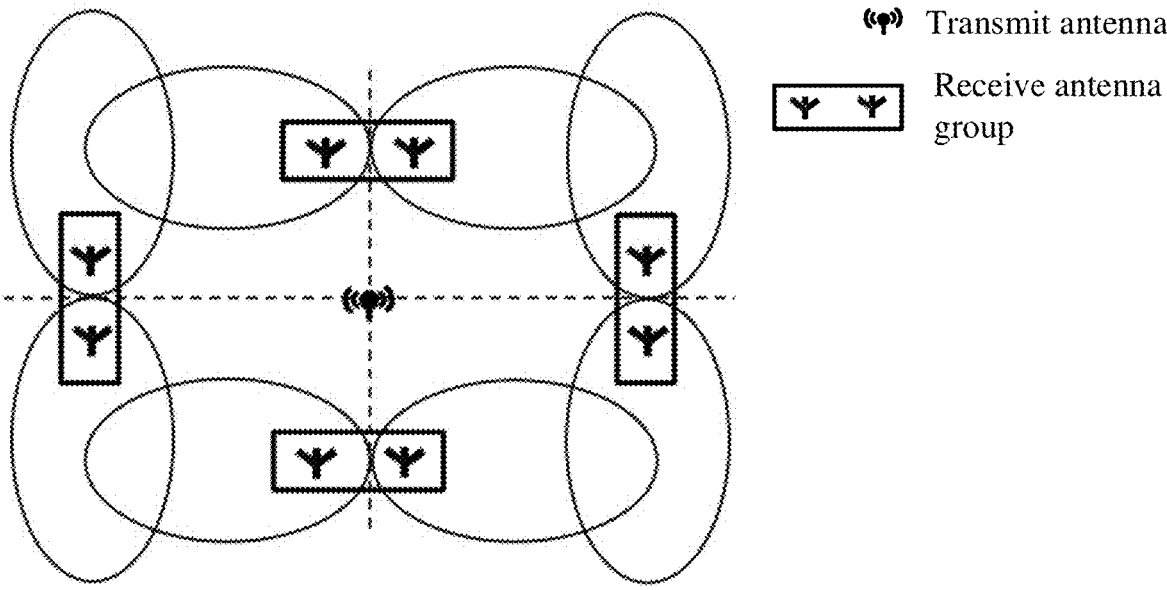
FIG. 4 is a schematic structural diagram of another full-duplex antenna according to an embodiment.

In a first implementation, FIG. 4 shows a schematic structural diagram of another full-duplex antenna according to an embodiment. The full-duplex antenna includes: one transmit antenna, four receive antenna groups, and four radio frequency links (or referred to as RF chains) (not shown in FIG. 4). Each of the receive antenna groups includes two receive antennas. All receive antennas in one receive antenna group share one radio frequency link. Because the cost of the multi-antenna design is mainly on the radio frequency links, the scheme of sharing one radio frequency link in the receive antenna group can reduce the antenna manufacturing cost. The transmit antenna is located at an intersection point of perpendicular bisectors of the four receive antenna groups. In other words, distances between the two receive antennas in a receive antenna group and the transmit antenna are equal. Ideally, self-interference signals related to the transmit antenna in the first signals received by the two receive antennas are in-phase. In this case, the second signal synthesized from the first receive antenna group is $y_1=v_{1,1}y_{1,1}+v_{1,2}y_{1,2}$, the second signal synthesized from the second receive antenna group is $y_2=v_{2,1}y_{2,1}+v_{2,2}y_{2,2}$, the second signal synthesized from the third receive antenna group is $y_3=v_{3,1}y_{3,1}+v_{3,2}y_{3,2}$, and the second signal synthesized from the fourth receive antenna group is $y_4=v_{4,1}y_{4,1}+v_{4,2}y_{4,2}$, where $v_{1,1}=-v_{1,2}$, $v_{2,1}=-v_{2,2}$, $v_{3,1}=-v_{3,2}$;

$v_{4,1}=-v_{4,2}$. In other words, an effect of suppressing self-interference signals can be achieved by combining the first signals received by the two receive antennas in each group need into a second signal.

In addition, the second signal having being subjected to the self-interference suppression is quantized by an Analog-to-Digital Converter (ADC). This can prevent the problem that the ADC needs to quantify a large range due to the excessive power of the self-interference signal, which leads to low resolution of quantization of the effective signals.

In practice, due to the influence of antenna placement precision, self-interference channel multipath, and other factors, signals arriving at the same receive antenna group cannot completely achieve the same amplitude and phase, and even have differences in amplitude, resulting in that the self-interference cannot be perfectly eliminated. To improve the effect of self-interference cancellation, at least one of the following two measures may be adopted: (1) adjustable coefficient; and (2) digital cancellation. The adjustable coefficient means that the combining coefficient is no longer a fixed coefficient, but is controlled by a program, so as to achieve a more accurate self-interference suppression effect. The digital cancellation is to perform a digital domain operation on received signals having been subjected to intra-group combining and quantization, to realize self-interference cancellation. Because data symbols of the self-interference signal are known, a channel of self-interference in a residual self-interference signal can be estimated based on these data symbols, and then a residual self-interference received signal can be reconstructed based on the self-interference data symbols and the estimated channel of residual self-interference, and canceled on the received signal.

In addition to the self-interference cancellation, the full-duplex antenna shown in FIG. 4 can also support multi-user transmission. To be specific, a transmit antenna of a first user transmits a signal in all directions, and this transmit signal is self-interfering to the first user. After the self-interference signal arrives at a plurality of receive antenna groups of the first user, the self-interference signal is suppressed through intra-group antenna combining. Transmit signals from users other than the first user are not suppressed in each receive antenna group of the first user. In this way, four second signals are obtained through combining in the four receive antenna groups, and on these four second signals, different users have different equivalent channel coefficients. Therefore, this may be regarded as reception in a 4-antenna Multi-Input Single-Output (MISO) system, and multi-user interference can be suppressed through spatial combining, to realize multi-user transmission. In addition, to increase the number of users supported by the receiving end, a continuous interference cancellation technology may also be used to reduce multi-user interference. Depending on the multi-user near-far effect and the channel quality, the continuous interference cancellation can be symbol-level or codeword-level.

Figure 5:
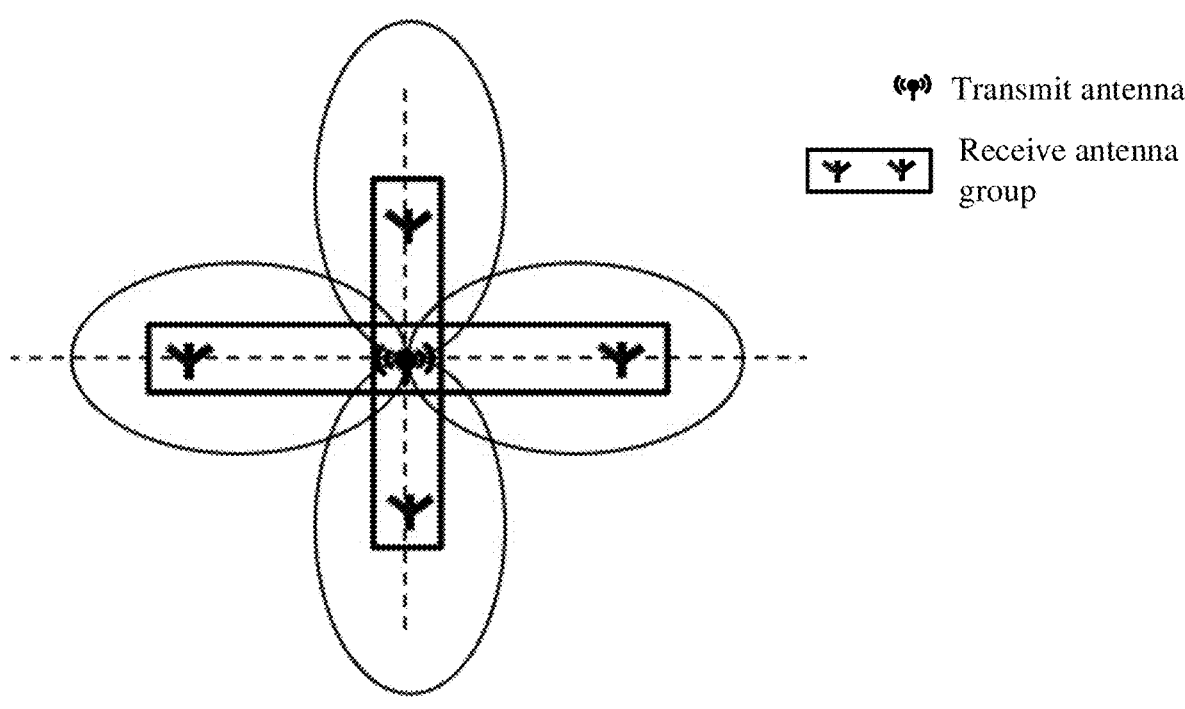
FIG. 5 is a schematic structural diagram of still another full-duplex antenna according to an embodiment.

In a second implementation, FIG. 5 shows a schematic structural diagram of still another full-duplex antenna according to an embodiment. The full-duplex antenna includes: one transmit antenna, two receive antenna groups, and two radio frequency links (or referred to as RF chains) (not shown in FIG. 5). Each of the receive antenna groups includes two receive antennas. All receive antennas in one receive antenna group share one radio frequency link. Because the cost of the multi-antenna design is mainly on the radio frequency links, the scheme of sharing one radio frequency link in the receive antenna group can reduce the antenna manufacturing cost. The transmit antenna is located at a midpoint of the two receive antenna groups. In other words, amplitudes and distances between the two receive antennas in a receive antenna group and the transmit antenna are equal. Ideally, self-interference signals related to the transmit antenna in the first signals received by the two receive antennas are in-phase. In this case, the second signal synthesized from the first receive antenna group is $y_1 = v_{1,1} y_{1,1} + v_{1,2} y_{1,2}$, and the second signal synthesized from the second receive antenna group is $y_2 = v_{2,1} y_{2,1} + v_{2,2} y_{2,2}$, where $v_{1,1} = -v_{1,2}$, and $v_{2,1} = -v_{2,2}$. In other words, an effect of suppressing self-interference signals can be achieved by only combining the first signals received by the two receive antennas in each group into a second signal.

In addition, the second signal having being subjected to the self-interference suppression is quantized by an ADC. This can prevent the problem that the ADC needs to quantify a large range due to the excessive power of the self-interference signal, which leads to low resolution of quantization of the effective signals.

In practice, due to the influence of antenna placement precision, self-interference channel multipath, and other factors, signals arriving at the same receive antenna group cannot completely achieve the same amplitude and phase, and even have differences in amplitude, resulting in that the self-interference cannot be perfectly eliminated. To improve the effect of self-interference cancellation, at least one of the following two measures may be adopted: (1) adjustable coefficient; and (2) digital cancellation. The adjustable coefficient means that the combining coefficient is no longer a fixed coefficient, but is controlled by a program, so as to achieve a more accurate self-interference suppression effect. The digital cancellation is to perform a digital domain operation on received signals having been subjected to intra-group combining and quantization, to realize self-interference cancellation. Because data symbols of the self-interference signal are known, a channel of self-interference in a residual self-interference signal can be estimated based on these data symbols, and then a residual self-interference received signal can be reconstructed based on the self-interference data symbols and the estimated channel of residual self-interference, and canceled on the received signal.

In addition to the self-interference cancellation, the full-duplex antenna shown in FIG. 5 can also support multi-user transmission. To be specific, a transmit antenna of a first user transmits a signal in all directions, and this transmit signal is self-interfering to the first user. After the self-interference signal arrives at a plurality of receive antenna groups of the first user, the self-interference signal is suppressed through intra-group antenna combining. Transmit signals from users other than the first user are not suppressed in each receive antenna group of the first user. In this way, two second signals are obtained through combining in the two receive antenna groups, and on these two second signals, different users have different equivalent channel coefficients. Therefore, this may be regarded as reception in a 2-antenna MISO system, and multi-user interference can be suppressed through spatial combining, to realize multi-user transmission. In addition, to increase the number of users supported by the receiving end, a continuous interference cancellation technology may also be used to reduce multi-user interference. Depending on the multi-user near-far effect and the channel quality, the continuous interference cancellation can be symbol-level or codeword-level.

Figure 6:
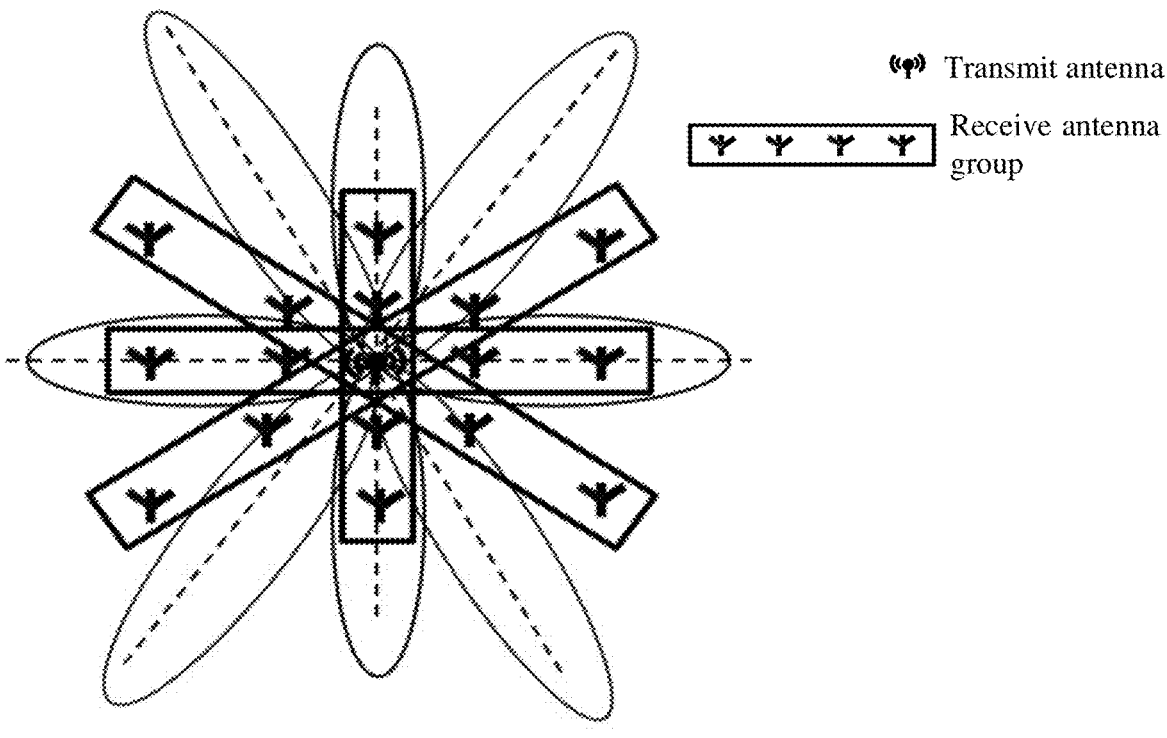
FIG. 6 is a schematic structural diagram of yet another full-duplex antenna according to an embodiment.

In a third implementation, FIG. 6 shows a schematic structural diagram of yet another full-duplex antenna according to an embodiment. The full-duplex antenna includes: one transmit antenna, four receive antenna groups, and four radio frequency links (or referred to as RF chains) (not shown in FIG. 6). Each of the receive antenna groups includes four receive antennas. All receive antennas in one receive antenna group share one radio frequency link. Because the cost of the multi-antenna design is mainly on the radio frequency links, the scheme of sharing one radio frequency link in the receive antenna group can reduce the antenna manufacturing cost. The transmit antenna is located at a midpoint of the four receive antenna groups. In other words, amplitudes and distances between two outermost receive antennas in a receive antenna group and the transmit antenna are equal. Ideally, self-interference signals related to the transmit antenna in the first signals received by the two receive antennas are in-phase. Similarly, amplitudes and distances between two innermost receive antennas in a receive antenna group and the transmit antenna are equal. Ideally, self-interference signals related to the transmit antenna in the first signals received by the two receive antennas are in-phase. In this case, the second signal synthesized from the first receive antenna group is $y_1 = v_{1,1} y_{1,1} + v_{1,2} y_{1,2} + v_{1,3} y_{1,3} + v_{1,4} y_{1,4}$, the second signal synthesized from the second receive antenna group is $y_2 = v_{2,1} y_{2,1} + v_{2,2} y_{2,2} + v_{2,3} y_{2,3} + v_{2,4} y_{2,4}$, the second signal synthesized from the third receive antenna group is $y_3 = v_{3,1} y_{3,1} + v_{3,2} y_{3,2} + v_{3,3} y_{3,3} + v_{3,4} y_{3,4}$, and the second signal synthesized from the fourth receive antenna group is $y_4 = v_{4,1} y_{4,1} + v_{4,2} y_{4,2} + v_{4,3} y_{4,3} + v_{4,4} y_{4,4}$, where $v_{1,1} = -v_{1,4}$, $v_{1,2} = -v_{1,3}$, $v_{2,1} = -v_{2,4}$, $v_{2,2} = -v_{2,3}$, $v_{3,1} = -v_{3,4}$, $v_{3,2} = -v_{3,3}$, $v_{4,1} = -v_{4,4}$, and $v_{4,2} = -v_{4,3}$. In other words, an effect of suppressing self-interference signals can be achieved by combining the first signals received by the four receive antennas in each group need into a second signal.

In addition, the second signal having being subjected to the self-interference suppression is quantized by an ADC. This can prevent the problem that the ADC needs to quantify a large range due to the excessive power of the self-interference signal, which leads to low resolution of quantization of the effective signals.

In practice, due to the influence of antenna placement precision, self-interference channel multipath, and other factors, signals arriving at the same receive antenna group cannot completely achieve the same amplitude and phase, and even have differences in amplitude, resulting in that the self-interference cannot be perfectly eliminated. To improve the effect of self-interference cancellation, at least one of the following two measures may be adopted: (1) adjustable coefficient; and (2) digital cancellation. The adjustable coefficient means that the combining coefficient is no longer a fixed coefficient, but is controlled by a program, so as to achieve a more accurate self-interference suppression effect. The digital cancellation is to perform a digital domain operation on received signals having been subjected to intra-group combining and quantization, to realize self-interference cancellation. Because data symbols of the self-interference signal are known, a channel of self-interference in a residual self-interference signal can be estimated based on these data symbols, and then a residual self-interference received signal can be reconstructed based on the self-interference data symbols and the estimated channel of residual self-interference, and canceled on the received signal.

In addition to the self-interference cancellation, the full-duplex antenna shown in FIG. 6 can also support multi-user transmission. To be specific, a transmit antenna of a first user transmits a signal in all directions, and this transmit signal is self-interfering to the first user. After the self-interference signal arrives at a plurality of receive antenna groups of the first user, the self-interference signal is suppressed through intra-group antenna combining. Transmit signals from users other than the first user are not suppressed in each receive antenna group of the first user. In this way, four second signals are obtained through combining in the four receive antenna groups, and on these four second signals, different users have different equivalent channel coefficients. Therefore, this may be regarded as reception in a 4-antenna MISO system, and multi-user interference can be suppressed through spatial combining, to realize multi-user transmission. In addition, to increase the number of users supported by the receiving end, a continuous interference cancellation technology may also be used to reduce multi-user interference. Depending on the multi-user near-far effect and the channel quality, the continuous interference cancellation can be symbol-level or codeword-level.

Figure 7:
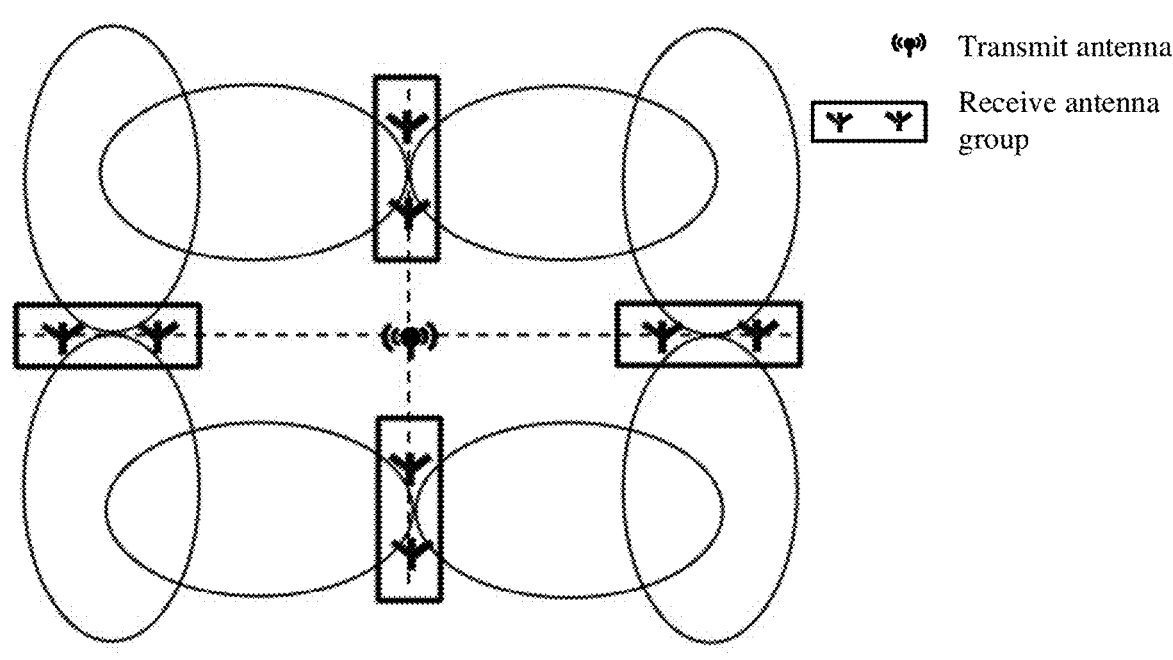
FIG. 7 is a schematic structural diagram of a further full-duplex antenna according to an embodiment.

In a fourth implementation, FIG. 7 shows a schematic structural diagram of a further full-duplex antenna according to an embodiment. The full-duplex antenna includes: one transmit antenna, four receive antenna groups, and four radio frequency links (or referred to as RF chains) (not shown in FIG. 7). Each of the receive antenna groups includes two receive antennas. All receive antennas in one receive antenna group share one radio frequency link. Because the cost of the multi-antenna design is mainly on the radio frequency links, the scheme of sharing one radio frequency link in the receive antenna group can reduce the antenna manufacturing cost. The transmit antenna is located at an intersection point of extension lines of lines connecting the antennas in the four receive antenna groups. When a pitch between two receive antennas in each receive antenna group is equal to (P+0.5) times a wavelength $\lambda$ of the full-duplex antenna (i.e., equal to $P\lambda+\lambda/2$), P is a non-negative integer. Ideally, self-interference signals related to the transmit antenna in the first signals received by the two receive antennas in the same group are out-of-phase. In this case, the second signal synthesized from the first receive antenna group is $y_1=v_{1,1}y_{1,1}+v_{1,2}y_{1,2}$, the second signal synthesized from the second receive antenna group is $y_2=v_{2,1}y_{2,1}+v_{2,2}y_{2,2}$, the second signal synthesized from the third receive antenna group is $y_3=v_{3,1}y_{3,1}+v_{3,2}y_{3,2}$, and the second signal synthesized from the fourth receive antenna group is $y_4=v_{4,1}y_{4,1}+v_{4,2}y_{4,2}$, where $v_{1,1}=v_{1,2}$, $v_{2,1}=v_{2,2}$, $v_{3,1}=v_{3,2}$, and $v_{4,1}=v_{4,2}$. In other words, an effect of suppressing self-interference signals can be achieved by combining the first signals received by the two receive antennas in each group need into a second signal.

In addition, the second signal having being subjected to the self-interference suppression is quantized by an ADC. This can prevent the problem that the ADC needs to quantify a large range due to the excessive power of the self-interference signal, which leads to low resolution of quantization of the effective signals.

In practice, due to the influence of antenna placement precision, self-interference channel multipath, and other factors, signals arriving at the same receive antenna group cannot completely achieve the same amplitude and phase, and even have differences in amplitude, resulting in that the self-interference cannot be perfectly eliminated. To improve the effect of self-interference cancellation, at least one of the following two measures may be adopted: (1) adjustable coefficient; and (2) digital cancellation. The adjustable coefficient means that the combining coefficient is no longer a fixed coefficient, but is controlled by a program, so as to achieve a more accurate self-interference suppression effect. The digital cancellation is to perform a digital domain operation on received signals having been subjected to intra-group combining and quantization, to realize self-interference cancellation. Because data symbols of the self-interference signal are known, a channel of self-interference in a residual self-interference signal can be estimated based on these data symbols, and then a residual self-interference received signal can be reconstructed based on the self-interference data symbols and the estimated channel of residual self-interference, and canceled on the received signal.

In addition to the self-interference cancellation, the full-duplex antenna shown in FIG. 7 can also support multi-user transmission. To be specific, a transmit antenna of a first user transmits a signal in all directions, and this transmit signal is self-interfering to the first user. After the self-interference signal arrives at a plurality of receive antenna groups of the first user, the self-interference signal is suppressed through intra-group antenna combining. Transmit signals from users other than the first user are not suppressed in each receive antenna group of the first user. In this way, four second signals are obtained through combining in the four receive antenna groups, and on these four second signals, different users have different equivalent channel coefficients. Therefore, this may be regarded as reception in a 4-antenna MISO system, and multi-user interference can be suppressed through spatial combining, to realize multi-user transmission. In addition, to increase the number of users supported by the receiving end, a continuous interference cancellation technology may also be used to reduce multi-user interference. Depending on the multi-user near-far effect and the channel quality, the continuous interference cancellation can be symbol-level or codeword-level.

Figure 8:
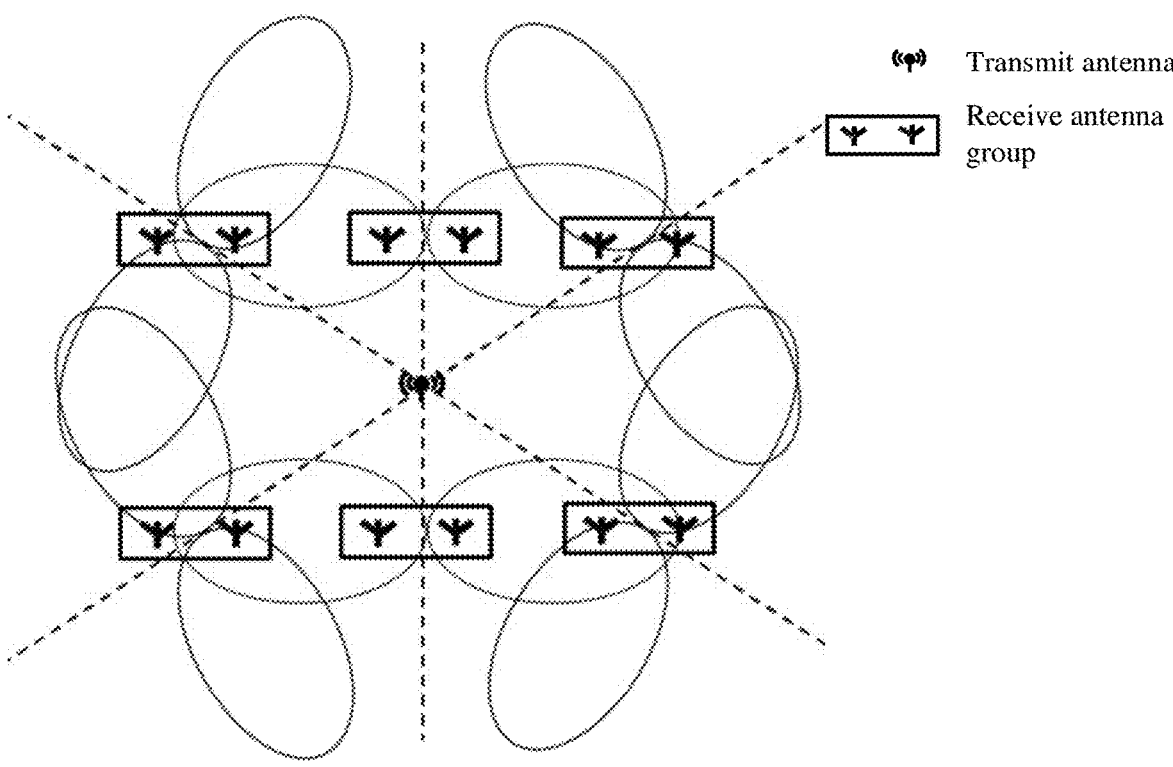
FIG. 8 is a schematic structural diagram of still a further full-duplex antenna according to an embodiment.

In a fifth implementation, FIG. 8 shows a schematic structural diagram of still a further full-duplex antenna according to an embodiment. The full-duplex antenna includes: one transmit antenna, six receive antenna groups, and six radio frequency links (or referred to as RF chains) (not shown in FIG. 8). Each of the receive antenna groups includes two receive antennas. All receive antennas in one receive antenna group share one radio frequency link. Because the cost of the multi-antenna design is mainly on the radio frequency links, the scheme of sharing one radio frequency link in the receive antenna group can reduce the antenna manufacturing cost. The transmit antenna is located at any position in the six receive antenna groups (as shown in FIG. 8, the transmit antenna is located at an intersection point of a line connecting an upper left receive antenna group and a lower right receive antenna group, a line connecting a lower left receive antenna group and an upper right receive antenna group, and a line connecting an upper middle receive antenna group and a lower middle receive antenna group). In this case, the second signal synthesized from the first receive antenna group is $y_1=v_{1,1}y_{1,1}+v_{1,2}y_{1,2}$, the second signal synthesized from the second receive antenna group is $y_2=v_{2,1}y_{2,1}+v_{2,2}y_{2,2}$, the second signal synthesized from the third receive antenna group is $y_3=v_{3,1}y_{3,1}+v_{3,2}y_{3,2}$, the second signal synthesized from the fourth receive antenna group is $y_4=v_{4,1}y_{4,1}+v_{4,2}y_{4,2}$, the second signal synthesized from the fifth receive antenna group is $y_5=v_{5,1}y_{5,1}+v_{5,2}y_{5,2}$, the second signal synthesized from the sixth receive antenna group is $y_6=v_{6,1}y_{6,1}+v_{6,2}y_{6,2}$. In other words, an effect of suppressing self-interference signals can be achieved by combining the first signals received by the two receive antennas in each group need into a second signal. Ideally, the combining coefficient may be fixed.

In addition, the second signal having being subjected to the self-interference suppression is quantized by an ADC.

This can prevent the problem that the ADC needs to quantify a large range due to the excessive power of the self-interference signal, which leads to low resolution of quantization of the effective signals.

In practice, due to the influence of antenna placement precision, self-interference channel multipath, and other factors, signals arriving at the same receive antenna group cannot completely achieve the same amplitude and phase, and even have differences in amplitude, resulting in that the self-interference cannot be perfectly eliminated. To improve the effect of self-interference cancellation, at least one of the following two measures may be adopted: (1) adjustable coefficient; and (2) digital cancellation. The adjustable coefficient means that the combining coefficient is no longer a fixed coefficient, but is controlled by a program, so as to achieve a more accurate self-interference suppression effect. The digital cancellation is to perform a digital domain operation on received signals having been subjected to intra-group combining and quantization, to realize self-interference cancellation. Because data symbols of the self-interference signal are known, a channel of self-interference in a residual self-interference signal can be estimated based on these data symbols, and then a residual self-interference received signal can be reconstructed based on the self-interference data symbols and the estimated channel of residual self-interference, and canceled on the received signal.

In addition to the self-interference cancellation, the full-duplex antenna shown in FIG. 8 can also support multi-user transmission. To be specific, a transmit antenna of a first user transmits a signal in all directions, and this transmit signal is self-interfering to the first user. After the self-interference signal arrives at a plurality of receive antenna groups of the first user, the self-interference signal is suppressed through intra-group antenna combining. Transmit signals from users other than the first user are not suppressed in each receive antenna group of the first user. In this way, six second signals are obtained through combining in the six receive antenna groups, and on these six second signals, different users have different equivalent channel coefficients. Therefore, this may be regarded as reception in a 6-antenna MISO system, and multi-user interference can be suppressed through spatial combining, to realize multi-user transmission. In addition, to increase the number of users supported by the receiving end, a continuous interference cancellation technology may also be used to reduce multi-user interference. Depending on the multi-user near-far effect and the channel quality, the continuous interference cancellation can be symbol-level or codeword-level.

Figure 9:
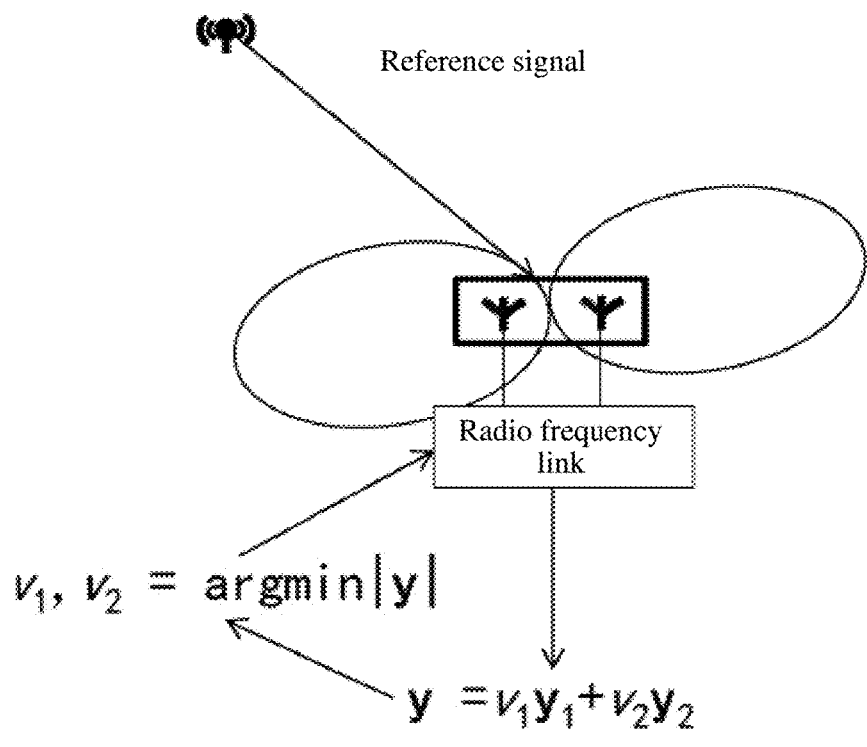
FIG. 9 is a schematic diagram of adjusting, by a full-duplex antenna, a combining coefficient by minimizing a self-interference signal strength according to an embodiment.

In a sixth implementation, FIG. 9 shows a schematic diagram of adjusting, by a full-duplex antenna, a combining coefficient by minimizing a self-interference signal strength according to an embodiment. Assuming that a radio frequency link is connected to two receive antennas (i.e., one receive antenna group includes two receive antennas), an objective of adjusting the combining coefficient by the radio frequency link is to cause intra-group combining of the radio frequency link to suppress as much as possible a reference signal sent from a transmit antenna of the same user. In this implementation, the transmit antenna of the same user sends the reference signal, and the radio frequency link performs combining using a preset or random combining coefficient to obtain $y=v_1y_1+v_2y_2$. Combining coefficients $v_1$ and $v_2$ are adjusted by feeding back energy of a signal obtained through intra-group combining, to minimize $|y|$. $|\cdot|$ represents calculating a 2-norm. In this process, the transmit antenna of the same user may need to send the reference signal more than once, so that $|y|$ converges to a small enough value.

Figure 10:
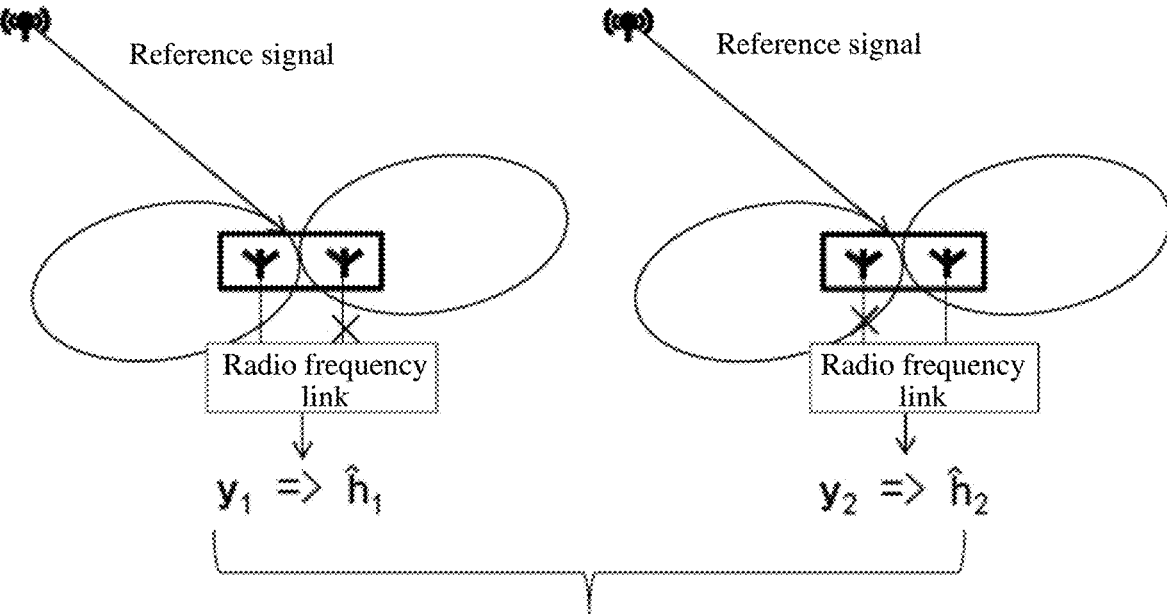
FIG. 10 is a schematic diagram of adjusting, by a full-duplex antenna, a combining coefficient through antenna-by-antenna channel estimation according to an embodiment.

In a seventh implementation, FIG. 10 shows a schematic diagram of adjusting, by a full-duplex antenna, a combining coefficient through antenna-by-antenna channel estimation according to an embodiment. Assuming that a radio frequency link is connected to two receive antennas (i.e., one receive antenna group includes two receive antennas), an objective of adjusting the combining coefficient by the radio frequency link is to cause intra-group combining of the radio frequency link to suppress as much as possible a reference signal sent from a transmit antenna of the same user. In this implementation, the transmit antenna of the same user sends a reference signal, and the radio frequency link obtains channel coefficients $\hat{h}_1$ and $\hat{h}_2$ on different antennas by switching the connection of antennas, and then calculates combining coefficients $v_1$ and $v_2$ based on the channel coefficients.

In an eighth implementation, FIG. 11 shows a schematic diagram of adjusting, by a full-duplex antenna, a combining coefficient by calculating a residual self-interference signal strength according to an embodiment. Assuming that a radio frequency link is connected to two receive antennas (i.e., one receive antenna group includes two receive antennas), an objective of adjusting the combining coefficient by the radio frequency link is to cause intra-group combining of the radio frequency link to suppress as much as possible a reference signal or a data signal and a reference signal sent from a transmit antenna of the same user. In this implementation, the transmit antenna of the same user sends the reference signal or sends the data signal and the reference signal, and the radio frequency link performs combining using a preset combining coefficient to obtain $y=v_1y_1+v_2y_2$. In addition, information such as residual self-interference energy and channel can be calculated based on the reference signal and the signal obtained through intra-group combining or based on the data signal, the reference signal, and the signal obtained through intra-group combining, and fed back to the radio frequency link to adjust the combining coefficients $v_1$ and $v_2$.

In a ninth implementation, FIG. 12 shows a schematic diagram of combining N second signals to obtain K data estimation signals by a full-duplex antenna according to an embodiment. Assuming that the full-duplex antenna includes N receive antenna groups, each receive antenna group includes two receive antennas, and after N second signals are obtained through intra-group combining in the receive antenna groups, inter-group combining is further required before data estimation. Inter-group combining is also beneficial to suppressing the self-interference signal. Assuming that N second signals $Y=[y_1, y_2, \ldots, y_N]^T \in C^{N \times L}$ are combined according to K combining ratios, K data estimation signals $X=WY$, $W \in C^{K \times L}$ are obtained. These data estimation signals are sent to a demodulation and decoding module. After a Cyclic Redundancy Check (CRC) check, a checked data signal can be obtained. Generally, the checked data signal is considered to be a correctly demodulated data signal by default.

Figure 13:
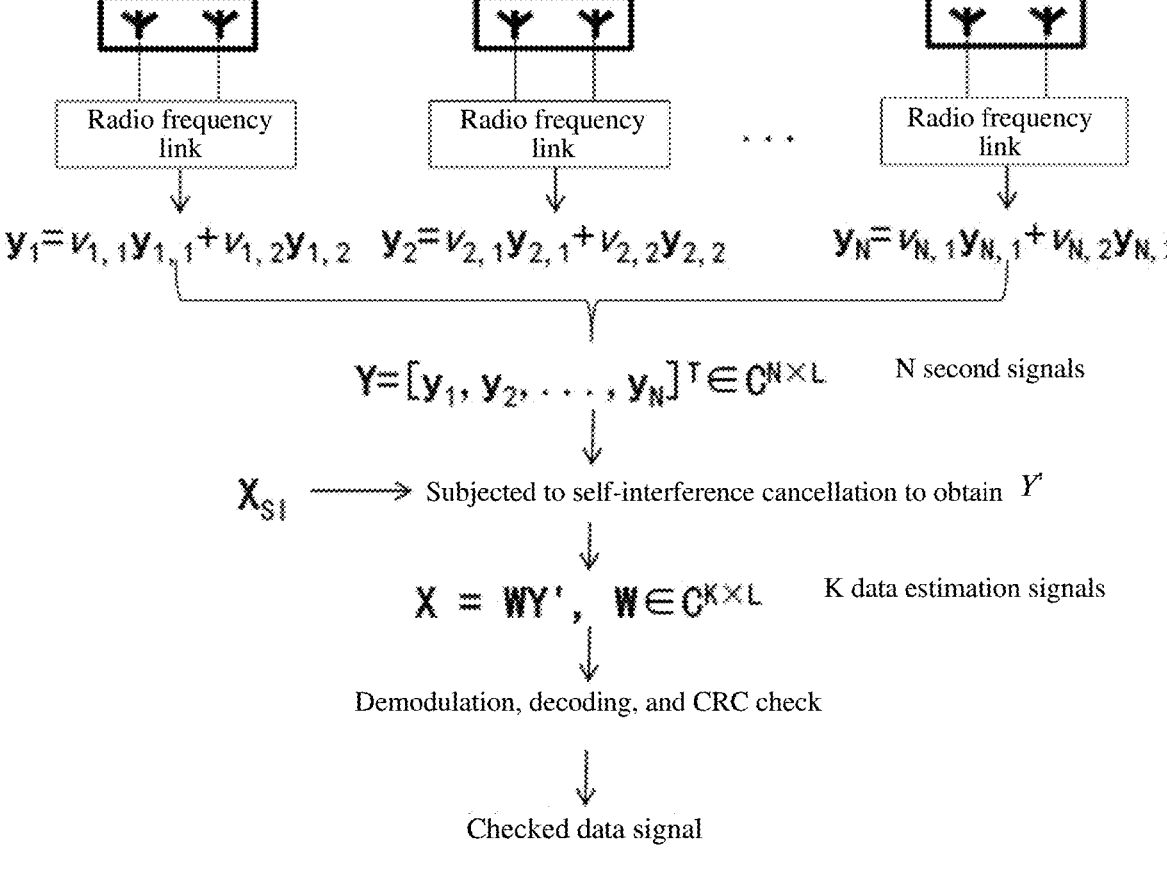
FIG. 13 is another schematic diagram of combining N second signals to obtain K data estimation signals by a full-duplex antenna according to an embodiment.

In a tenth implementation, FIG. 13 shows another schematic diagram of combining N second signals to obtain K data estimation signals by a full-duplex antenna according to an embodiment. Assuming that the full-duplex antenna includes N receive antenna groups, each receive antenna group includes two receive antennas, and after N second signals are obtained through intra-group combining in the receive antenna groups, inter-group combining is further required before data estimation. Inter-group combining is also beneficial to suppressing the self-interference signal. In some examples, self-interference cancellation may be performed based on a self-interference data packet. Specific operations are as follows. Channel estimation is performed based on a transmit signal $X_{SI}$ on a transmit antenna. Then, a self-interference signal is reconstructed according to the channel estimation and the transmit signal. Finally, the reconstructed self-interference signal is eliminated from the second signal. Assuming that N second signals $Y=[y_1, y_2, \ldots, y_N]^T \in C^{N \times L}$ are combined according to K combining ratios, K data estimation signals $X=WY'$, $W \in C^{K \times L}$ are obtained. The transmit signal is a data signal or a reference signal. These data estimation signals are sent to a demodulation and decoding module. After a CRC check, a checked data signal can be obtained. Generally, the checked data signal is considered to be a correctly demodulated data signal by default.

Figure 14:
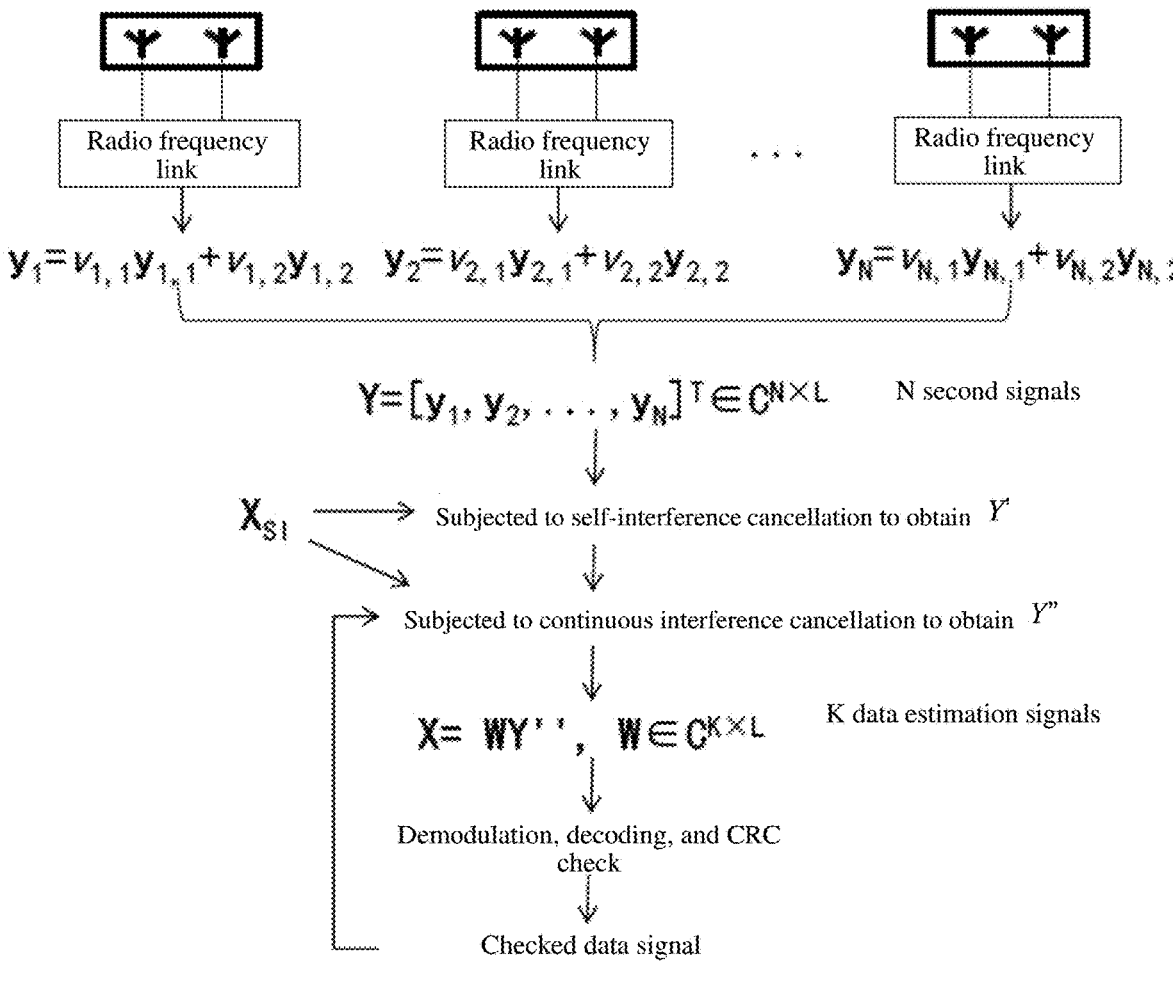
FIG. 14 is still another schematic diagram of combining N second signals to obtain K data estimation signals by a full-duplex antenna according to an embodiment.

In an eleventh implementation, FIG. 14 shows still another schematic diagram of combining N second signals to obtain K data estimation signals by a full-duplex antenna according to an embodiment. Assuming that the full-duplex antenna includes N receive antenna groups, each receive antenna group includes two receive antennas, and after N second signals are obtained through intra-group combining in the receive antenna groups, inter-group combining is further required before data estimation. Inter-group combining is also beneficial to suppressing the self-interference signal. In some examples, self-interference cancellation may be performed based on a self-interference data packet. Specific operations are as follows. Channel estimation is performed based on the reference signal, or the data symbol, or the reference signal and the data symbol in the data packet. Then, a self-interference signal is reconstructed according to the channel estimation and the data packet. Finally, the reconstructed self-interference signal is eliminated from the second signal. Assuming that N second signals $Y=[y_1, y_2, \ldots, y_N]T \in C^{N \times L}$ are combined according to K combining ratios, K data estimation signals $X=WY''$, $W \in C^{K \times L}$ are obtained. These data estimation signals are sent to a demodulation and decoding module. After a CRC check, a checked data signal can be obtained. Generally, the checked data signal is considered to be a correctly demodulated data signal by default.

In this implementation, after some data signals are accurately obtained through demodulation, these data signals need to be sent to an interference cancellation module, and then combined, demodulated, decoded, and CRC checked again. This operation is repeated until no new data signal can pass the CRC check. This operation is referred to as continuous interference cancellation. In the continuous interference cancellation shown in FIG. 14, not only the checked data signal but also the information of the self-interference data packet can be used. If the continuous interference cancellation is performed using both the checked data signal and a self-interference cancellation signal, the self-interference cancellation operation may be omitted because its function may be completely included in the continuous interference cancellation operation. In addition, during the continuous interference cancellation, the reference signal part may also be canceled to improve the precision of each round of channel estimation. This method is used in a scheme based on a non-orthogonal pilot reference signal.

In the first to fifth implementations described above, several antenna deployment modes are presented, and an intra-group combining coefficient may be preliminarily determined according to the antenna deployment. Ideally, such a combining coefficient does not need to be adjusted. In the sixth to eighth implementations described above, considering the impact of non-ideal factors, several methods of adjusting the intra-group combining coefficient are presented. The non-ideal factors include the physical precision of antenna deployment, a multipath difference between antenna channels in the same group, hardware defects, etc. The sixth to eighth implementations may not be performed when the non-ideal factors have small impact. In the ninth to eleventh implementations described above, several methods of processing and combining second signals are presented, and finally the required data estimation can be obtained for demodulation and decoding.

An embodiment of the present disclosure provides a full-duplex antenna, including: a transmit antenna, N receive antenna groups, and N radio frequency links, where N is an integer greater than or equal to 2. The receive antenna groups are connected to the radio frequency links on a one-to-one basis. Each of the receive antenna groups includes at least two receive antennas. The radio frequency link is configured for acquiring first signals received by all receive antennas in the receive antenna group connected to the radio frequency link, and synthesizing a second signal according to the first signals. A power of a self-interference signal related to the transmit antenna in each of the first signals in a full-duplex transmission mode is defined as a first power. A power of a self-interference signal related to the transmit antenna in the second signal in the full-duplex transmission mode is defined as a second power. The second power is less than any of the first powers. With the use of a multi-receive antenna technology, the number of users supported is increased and self-interference of antennas is effectively suppressed. Meanwhile, the use of a full-duplex technology realizes simultaneous transmitting and receiving of data, which greatly improves the spectral efficiency and reduces the transmission latency.

An embodiment of the present disclosure provides a communication node, including a full-duplex antenna having the features of any one of the above embodiments. The device may be a terminal device provided in any embodiment of the present disclosure, or an access network device provided in any embodiment of the present disclosure, which is not particularly limited in the present disclosure.

The following embodiment provides a schematic structural diagram of a communication-node which is a UE.

Figure 15:
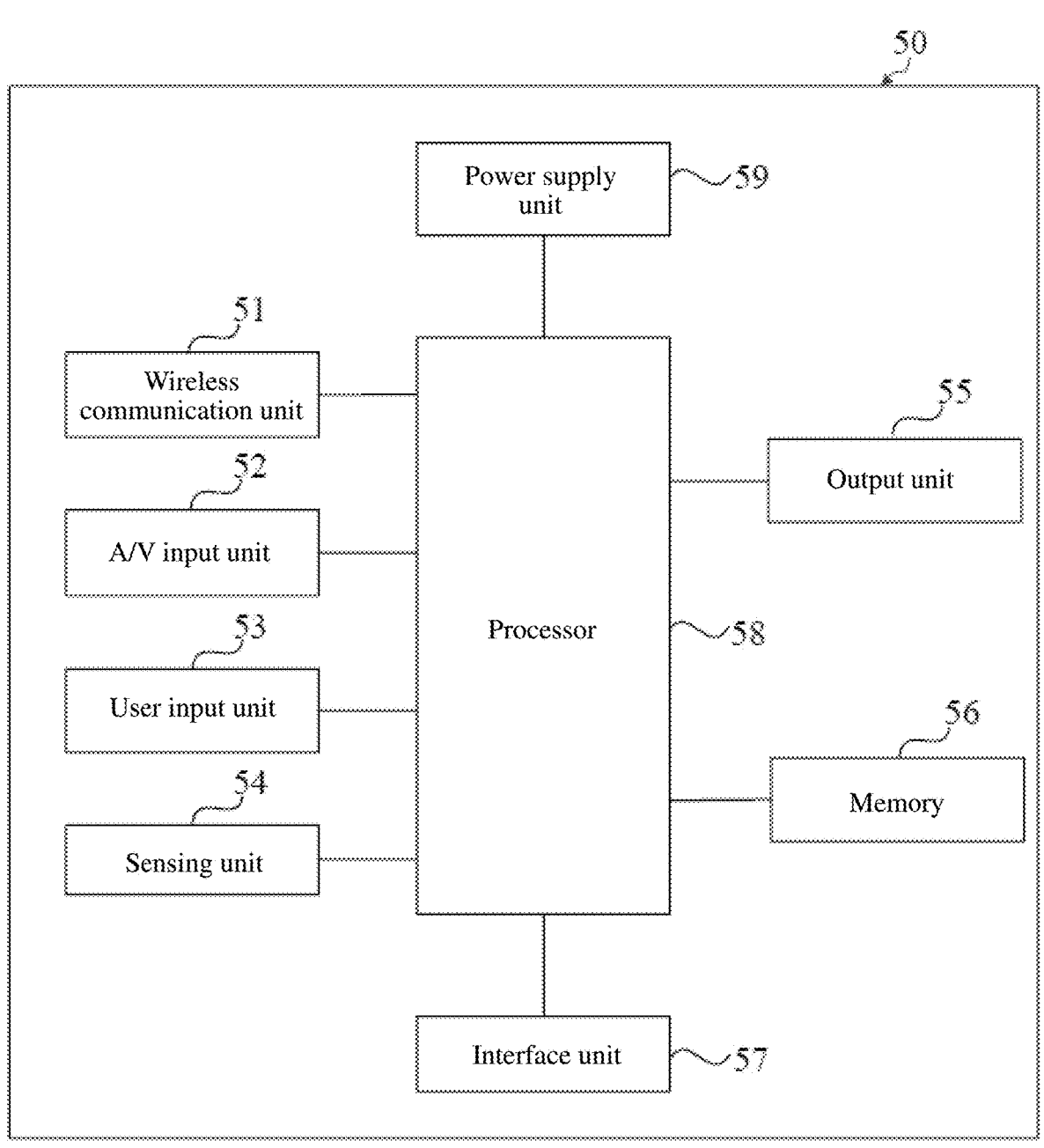
FIG. 15 is a schematic structural diagram of a user equipment (UE) according to an embodiment.

FIG. 15 is a schematic structural diagram of a UE according to an embodiment. The UE may be implemented in a variety of forms. The UE in the present disclosure may include, but not limited to, a mobile terminal device such as a mobile phone, a smart phone, a notebook computer, a digital broadcast receiver, a Personal Digital Assistant (PDA), a tablet computer (PAD), a Portable Media Player (PMP), a navigation device, a vehicle-mounted terminal device, a vehicle-mounted display terminal, a vehicle-mounted electronic rear view mirror, etc. and a fixed terminal device such as a digital television (TV), a desktop computer, etc.

As shown in FIG. 15, the UE 50 may include a wireless communication unit 51, an Audio/Video (A/V) input unit 52, a user input unit 53, a sensing unit 54, an output unit 55, a memory 56, an interface unit 57, a processor 58, a power supply unit 59, etc. Although FIG. 15 illustrates a UE including a plurality of components, it should be understood that not all of the illustrated components are required to be implemented. More or fewer components may be implemented instead.

In this embodiment, the wireless communication unit 51 provides radio communication between the UE 50 and a base station or network. The A/V input unit 52 is configured for receiving an audio or video signal. The user input unit 53 may generate key input data according to a command input by a user to control a plurality of operations of the UE 50. The sensing unit 54 detects a current status of the UE 50, a location of the UE 50, presence of a touch input performed by the user on the UE 50, an orientation of the UE 50, acceleration or deceleration movement and direction of the UE 50, and the like, and generates a command or a signal for controlling an operation of the UE 50. The interface unit 57 serves as an interface through which at least one external device can be connected to the UE 50. The output unit 55 is configured for providing an output signal in a visual, audio, and/or tactile manner. The memory 56 may store a software program or the like executable by the processor 58 to perform processing and control operations, or may temporarily store data that has been outputted or data that is to be outputted. The memory 56 may include at least one type of storage medium. The UE 50 may cooperate with a network storage device that performs a storage function of the memory 56 via a network connection. The processor 58 generally controls the overall operation of the UE 50. The power supply unit 59 receives external power or internal power under the control of the processor 58 and provides appropriate power required to operate a plurality of elements and components.

The processor 58 runs the program stored in the memory 56 to execute various at least one functional application and data processing.

According to an embodiment of the present disclosure, a computer-readable storage medium is also provided. The computer-readable storage medium stores a computer program which, when executed by a processor, causes the processor to implement the method disclosed in any embodiment of the present disclosure.

The computer-readable storage medium in the embodiment of the present disclosure may be any combination of one or more computer-readable media. The computer-readable medium may be a computer-readable signal medium or a computer-readable storage medium. For example, the computer-readable storage medium may include, but not limited to, an electrical, magnetic, optical, electromagnetic, infrared, or semiconductor system, apparatus, or device, or any combination thereof. The computer-readable storage medium includes (non-exclusive list), an electrical connection having one or more wires, a portable computer disk, a hard disk, a Random Access Memory (RAM), a Read-Only Memory (ROM), an erasable programmable Read-Only Memory (EPROM), a flash memory, an optical fiber, a portable Compact Disc Read-Only Memory (CD-ROM), an optical storage device, a magnetic storage device, or any suitable combination thereof. In the present disclosure, the computer-readable storage medium may be any tangible medium containing or storing a program that may be used by or in combination with an instruction execution system, apparatus, or device.

The computer-readable signal medium may include a data signal propagated in a baseband or as part of a carrier. The data signal carries computer-readable program code. Such a propagated data signal may be in a variety of forms including, but not limited to, an electromagnetic signal, an optical signal, or any suitable combination thereof. The computer-readable signal medium may also be any computer-readable medium other than a computer-readable storage medium, and may send, propagate, or transmit a program for use by or in combination with an instruction execution system, apparatus, or device.

The program code contained on the computer-readable medium may be transmitted using any suitable medium, including but not limited to, via wireless transmission, via a wire, via a fiber optic cable, via Radio Frequency (RF), etc., or any suitable combination thereof.

Computer program code for executing the operations of the present disclosure may be compiled in one or more programming languages or a combination of programming languages, including object-oriented programming languages (such as Java, Smalltalk, C++, Ruby, Go) and conventional procedural programming languages (such as the "C" language or similar programming languages). The program code can be entirely executed on a user's computer, partly executed on the user's computer, executed as a separate software package, partly executed on the user's computer and partly executed on a remote computer, or entirely executed on a remote computer or server. In cases involving a remote computer, the remote computer may be connected to the user's computer via any type of network (including a Local Area Network (LAN) or a Wide Area Network (WAN)), or may be connected to an external computer (e.g., via an Internet service provided by an Internet service provider).

As will be understood by those having ordinary skills in the art, the term "user terminal" encompasses any suitable type of wireless user equipment, such as a mobile telephone, portable data processing device, portable web browser or vehicle-mounted mobile station.

In general, the various embodiments of the present disclosure may be implemented in hardware or special purpose circuits, software, logic, or any combination thereof. For example, some aspects may be implemented in hardware, while other aspects may be implemented in firmware or software that can be executed by a controller, microprocessor or other computing device, but the present disclosure is not limited thereto.

The embodiments of the present disclosure may be implemented by the execution of computer program instructions by a data processor of a mobile device, for example, in a processor entity, or by hardware, or by a combination of software and hardware. The computer program instructions may be assembly instructions, Instruction Set Architecture (ISA) instructions, machine instructions, machine dependent instructions, microcode, firmware instructions, state setting data, or source code or object code written in any combination of one or more programming languages.

The block diagram of any logic flow in the accompanying drawings of the present disclosure may represent program steps, or may represent interconnected logic circuits, modules and functions, or may represent a combination of program steps and logic circuits, modules and functions. The computer program may be stored in a memory. The memory may be of any type suitable for the local technical environment and may be implemented using any suitable data storage technology, such as, but not limited to, ROM, RAM, and optical storage devices and systems (Digital Video Disc (DVD) or compact disk (CD)), etc. The computer-readable medium may include a non-transitory storage medium. The data processor may be of any type suitable for the local technical environment, such as, but not limited to, a general-purpose computer, a special purpose computer, a microprocessor, a Digital Signal Processor (DSP), an Application Specific Integrated Circuit (ASIC), a programmable logic device (Field-Programmable Gate Array (FPGA)), and a processor based on a multi-core processor architecture.

The invention claimed is:

1. A full-duplex antenna, comprising: a transmit antenna, N receive antenna groups, and N radio frequency links, wherein the receive antenna groups are connected to the radio frequency links on a one-to-one basis, each of the receive antenna groups comprises at least two receive antennas, and N is an integer greater than or equal to 2; and each of the radio frequency links is configured to acquire first signals received by all receive antennas in one of the receive antenna groups connected to the radio frequency link, and synthesize a second signal according to the first signals, wherein a power of a self-interference signal related to the transmit antenna in each of the first signals in a full-duplex transmission mode is defined as a first power, a power of a self-interference signal related to the transmit antenna in the second signal in the full-duplex transmission mode is defined as a second power, and the second power is less than the first power;

wherein each of the receive antenna groups has a receive beam, and the transmit antenna is located in an intersection region of minimum energy regions of the receive beams of the N receive antenna groups.

2. The full-duplex antenna of claim 1, wherein, the transmit antenna is located at an intersection point of perpendicular bisectors of the N receive antenna groups; or the transmit antenna is located at a midpoint of the N receive antenna groups; or the transmit antenna is located at an intersection point of extension lines of lines connecting the antennas in the N receive antenna groups.

3. The full-duplex antenna of claim 1, wherein N is an even number greater than or equal to 2.

4. The full-duplex antenna of claim 1, wherein each of the receive antenna groups comprises M receive antennas, and M is an integer greater than or equal to 2.

5. The full-duplex antenna of claim 4, wherein M is an even number greater than or equal to 2.

6. The full-duplex antenna of claim 1, wherein for a $j^{th}$ receive antenna group among the N receive antenna groups and a radio frequency link connected to the $j^{th}$ receive antenna group, the $j^{th}$ receive antenna group comprises M receive antennas, where $1 \le j \le N$, and $M \ge 2$; and a second signal synthesized from the $j^{th}$ receive antenna group is $y_j = v_{j,1}y_{j,1} + v_{j,2}y_{j,2} + \ldots + v_{j,M}y_{j,M}$, $y_j \in C^{L \times 1}$, wherein $y_{j,1}$ represents a first signal received by a first receive antenna in the $j^{th}$ receive antenna group, $y_{j,2}$ represents a first signal received by a second receive antenna in the $j^{th}$ receive antenna group, ..., and $y_{j,M}$ represents a first signal received by an $M^{th}$ receive antenna in the $j^{th}$ receive antenna group; $v_{j,1}$ represents a combining coefficient corresponding to the first receive antenna in the $j^{th}$ receive antenna group, $v_{j,2}$ represents a combining coefficient corresponding to the second receive antenna in the $j^{th}$ receive antenna group, ..., and $v_{j,M}$ represents a combining coefficient corresponding to the $M^{th}$ receive antenna in the $j^{th}$ receive antenna group; and C represents a complex number, L represents a length of the second signal, and $C^{L \times 1}$ represents a complex vector set with a length of L.

7. The full-duplex antenna of claim 6, wherein the combining coefficient is a complex number, comprising an amplitude and a phase; and the amplitude of the combining coefficient is fixed or adjustable, and the phase of the combining coefficient is fixed or adjustable.

8. The full-duplex antenna of claim 7, wherein if at least one selected from a group consisting of the amplitude of the combining coefficient and the phase of the combining coefficient is adjustable:

the radio frequency links are configured to adjust at least one selected from a group consisting of the amplitude of the combining coefficient and the phase of the combining coefficient by minimizing a self-interference signal strength using a reference signal sent by the transmit antenna; or the radio frequency links are configured to adjust at least one selected from a group consisting of the amplitude of the combining coefficient and the phase of the combining coefficient by calculating a residual self-interference signal strength using a data signal or a data signal and a reference signal sent by the transmit antenna; or the radio frequency links are configured to adjust at least one selected from a group consisting of the amplitude of the combining coefficient and the phase of the combining coefficient through antenna-by-antenna channel estimation using a reference signal sent by the transmit antenna.

9. The full-duplex antenna of claim 7, if the amplitude of the combining coefficient and the phase of the combining coefficient are fixed:

in response to the transmit antenna being located at an intersection point of perpendicular bisectors of the N receive antenna groups, N being an even number, and each of the receive antenna groups comprising 2 receive antennas, $v_{j,1} = -v_{j,2}$; or in response to the transmit antenna being located at a midpoint of the N receive antenna groups, N being an even number, and each of the receive antenna groups comprising 2 receive antennas, $v_{j,1} = -v_{j,2}$; or in response to the transmit antenna being located at a midpoint of the N receive antenna groups, N being an even number, and each of the receive antenna groups comprising 4 receive antennas, $v_{j,1} = -v_{j,4}$, and $v_{j,2} = -v_{j,3}$; or in response to the transmit antenna being located at an intersection point of extension lines of lines connecting the antennas in the N receive antenna groups, N being an even number, each of the receive antenna groups comprising 2 receive antennas, and a pitch between the 2 receive antennas being equal to (P+0.5) times a wavelength of the full-duplex antenna, $v_{j,1} = v_{j,2}$, wherein P is a non-negative integer.

10. The full-duplex antenna of claim 6, wherein the N second signals synthesized from the N receive antenna groups are subjected to inter-group combining to obtain K data estimation signals, and the K data estimation signals are used for demodulation and decoding.

11. The full-duplex antenna of claim 10, wherein:

the N second signals $Y = [y_1, y_2, \ldots, y_N]^T \in C^{N \times L}$ are subjected to inter-group combining to obtain the K data estimation signals $X = WY$, $W \in C^{K \times L}$; or the N second signals $Y = [y_1, y_2, \ldots, y_N]^T \in C^{N \times L}$ are subjected to self-interference cancellation using a transmit signal $X_{SI}$ on the transmit antenna to obtain $Y'$, and $Y'$ are subjected to inter-group combining to obtain the K data estimation signals $X = WY'$, $W \in C^{K \times L}$; or the N second signals $Y = [y_1, y_2, \ldots, y_N]^T \in C^{N \times L}$ are subjected to self-interference cancellation and continuous interference cancellation in sequence to obtain Y", and Y" are subjected to inter-group combining to obtain the K data estimation signals $X=WY''$, $W \in C^{K \times L}$, wherein the transmit signal is a data signal or a reference signal, C represents a complex number, L represents a length of the second signal, and $C^{K \times L}$ represents a K×L complex number matrix set.

12. The full-duplex antenna of claim 11, wherein the continuous interference cancellation is symbol-level, or the continuous interference cancellation is codeword-level.

13. A communication node, comprising a full-duplex antenna comprising:

a transmit antenna, N receive antenna groups, and N radio frequency links, wherein the receive antenna groups are connected to the radio frequency links on a one-to-one basis, each of the receive antenna groups comprises at least two receive antennas, and N is an integer greater than or equal to 2; and each of the radio frequency links is configured to acquire first signals received by all receive antennas in one of the receive antenna groups connected to the radio frequency link, and synthesize a second signal according to the first signals, wherein a power of a self-interference signal related to the transmit antenna in each of the first signals in a full-duplex transmission mode is defined as a first power, a power of a self-interference signal related to the transmit antenna in the second signal in the full-duplex transmission mode is defined as a second power, and the second power is less than the first power;

wherein each of the receive antenna groups has a receive beam, and the transmit antenna is located in an inter-section region of minimum energy regions of the receive beams of the N receive antenna groups.

14. The communication node of claim 13, wherein, the transmit antenna is located at an intersection point of perpendicular bisectors of the N receive antenna groups; or the transmit antenna is located at a midpoint of the N receive antenna groups; or the transmit antenna is located at an intersection point of extension lines of lines connecting the antennas in the N receive antenna groups.

15. The communication node of claim 13, wherein N is an even number greater than or equal to 2.

16. The communication node of claim 13, wherein each of the receive antenna groups comprises M receive antennas, and M is an integer greater than or equal to 2.

17. The communication node of claim 16, wherein M is an even number greater than or equal to 2.

18. The communication node of claim 13, wherein for a $j^{th}$ receive antenna group among the N receive antenna groups and a radio frequency link connected to the $j^{th}$ receive antenna group, the $j^{th}$ receive antenna group comprises M receive antennas, where $1 \leq j \leq N$, and $M \geq 2$; and a second signal synthesized from the $j^{th}$ receive antenna group is $y_j = v_{j,1}y_{j,1} + v_{j,2}y_{j,2} + \ldots + v_{j,M}y_{j,M}$, $y_j \in C^{L \times 1}$, wherein $y_{j,1}$ represents a first signal received by a first receive antenna in the $j^{th}$ receive antenna group, $y_{j,2}$ represents a first signal received by a second receive antenna in the $j^{th}$ receive antenna group, . . . , and $y_{j,M}$ represents a first signal received by an $M^{th}$ receive antenna in the $j^{th}$ receive antenna group; $v_{j,1}$ represents a combining coefficient corresponding to the first receive antenna in the $j^{th}$ receive antenna group, $v_{j,2}$ represents a combining coefficient corresponding to the second receive antenna in the $j^{th}$ receive antenna group, . . . , and $v_{j,M}$ represents a combining coefficient corresponding to the $M^{th}$ receive antenna in the $j^{th}$ receive antenna group; and C represents a complex number, L represents a length of the second signal, and $C^{L \times 1}$ represents a complex vector set with a length of L.

* * * * *